Patented June 4, 1929.

1,716,323

UNITED STATES PATENT OFFICE.

THOMAS M. RECTOR, OF NEW YORK, N. Y., ASSIGNOR TO VITAPACK CORPORATION, OF NEW YORK, N. Y., A CORPORATION OF NEW YORK.

COFFEE PREPARATION.

No Drawing.  Application filed August 1, 1925. Serial No. 47,635.

This invention relates to a new method of preparing coffee for the purpose of using it as a beverage or as a flavoring material.

The usual method of preparing coffee by extraction is very wasteful in that a large percentage of the flavor is lost, and a considerable amount of the stimulating substances in the coffee is not extracted. The old method is also favorable to many deleterious chemical actions which result in the production of undesirable chemical substances and in the destruction of part of the flavor. These defects are present whether the extract is used as a liquid or is reduced to a powder.

It is the aim of the present invention to avoid these objectionable features incident to the process of extraction. Waste is prevented by using all of the coffee, and the product is prepared in a finely powdered form that is in a large measure soluble, thereby rendering extraction unnecessary.

A further object is to provide a process whereby this powdered coffee may be produced in a convenient and economical manner.

In practicing the present invention, the roasted coffee is first ground to any required fineness, even to the point of impalpability, in an edible oil or fat. By grinding the coffee in an oily medium a much finer product results than when the coffee is ground alone. The fatty medium should preferably be a neutral oil, i. e., an odorless and tasteless oil, thereby avoiding any undesirable odor or taste in the product. If desired, the grinding medium may consist of an oil charged with coffee substance, such as oil expressed from coffee.

The ground paste is next placed in a press and the surplus of oil removed. Any desirable percentage of oil may be left in the product, but it is preferable to allow from twelve to fifteen percent to remain, as this is the usual percentage of fat in the coffee bean.

The cake which is left in the press may then be reduced to a powder in an ordinary pulverizer. This powder, being very finely divided, is largely soluble and can be used for making coffee, as a flavoring material, or for many other uses. It can be combined with malted or powdered milk and sugar to form a prepared beverage. The insoluble portion of the coffee is so finely ground that it remains in suspension in the beverage in an unobjectionable form.

The oil which was expressed from the paste is now used for grinding a fresh batch of coffee, and is again expressed from the paste. This cyclic process is carried on as long as desired. Successive extractions leave the oil more heavily charged with the aromatic and stimulative elements of the coffee. Thus the process becomes more efficient as it continues, until a point is reached where the oil is practically pure coffee oil, and it then continues at maximum efficiency. If it is preferred not to use all the expressed oil to grind other batches of fresh coffee, it may be used as a flavoring constituent in itself, the oil having a fine, fresh, coffee flavor without any of the fibrous constituents of the coffee bean.

The paste produced by grinding the coffee in oil may also be used as a flavoring material or in producing confections.

The paste may also be emulsified into a material very readily soluble in water. In thus utilizing the material, a mixture is made from sugar, an emulsifying material such as egg or milk, and water. The coffee paste is then added to the emulsifying mixture, the whole forming an emulsion which dissolves readily in water. This emulsion may then be dried and powdered. The resulting powder is very useful as a flavoring material wherever rapid solubility in water is important.

I claim as my invention:—

1. The process of producing a coffee product which comprises grinding the coffee in a fatty medium, expressing part of the fatty medium, adding the expressed medium to a fresh batch of coffee, grinding the fresh batch, and expressing part of the fatty medium therefrom.

2. The process of producing a coffee product which comprises grinding the coffee in a fatty medium, pressing part of the fatty medium from the paste, and pulverizing the residue.

3. The process of producing a coffee product which comprises grinding coffee in a fatty medium and expressing the fatty medium to a predetermined extent.

4. The process of producing a coffee product which comprises grinding the coffee in a fatty medium charged with coffee substance.

5. The process of producing a coffee product which comprises grinding the coffee in a fatty medium charged with coffee substance, pressing the resulting paste, and pulverizing the residue.

6. The process of producing a coffee product which comprises grinding the coffee in a fatty medium, adding the ground paste to an emulsifying mixture, drying and then pulverizing the product.

7. The process which comprises grinding coffee in a fatty medium, and emulsifying the product in a water soluble medium.

In testimony whereof I affix my signature.

THOMAS M. RECTOR.